United States Patent [19]

Smith

[11] Patent Number: 4,671,212
[45] Date of Patent: Jun. 9, 1987

[54] GAS FIRED HEAT EXCHANGER FOR HOT WATER WITH BIMETALLIC SCOURING BAFFLE

[76] Inventor: Robert W. Smith, P.O. Box 583, 19 Albert St., Stouffville, Ontario, Canada, L0H 1L0

[21] Appl. No.: 842,216

[22] Filed: Mar. 21, 1986

[30] Foreign Application Priority Data

Mar. 22, 1985 [GB] United Kingdom ............... 8507476

[51] Int. Cl.$^4$ .............................................. F22B 5/02
[52] U.S. Cl. ....................................... 122/18; 122/14; 122/44 A; 122/155 A; 122/379; 165/94; 165/95; 165/109.1
[58] Field of Search ................. 122/379, 155 A, 44 A, 122/44 B, 13 R, 14, 18, 19; 110/326; 165/94, 95, 109.1; 138/38

[56] References Cited

U.S. PATENT DOCUMENTS

| | | | |
|---|---|---|---|
| 4,471,725 | 9/1984 | Holden | 122/44 A X |
| 4,557,220 | 12/1985 | Jannemann et al. | 122/14 X |
| 4,559,998 | 12/1985 | Counterman | 122/44 A X |
| 4,564,066 | 1/1986 | Gorman | 165/95 |

Primary Examiner—Edward G. Favors
Attorney, Agent, or Firm—Sim & McBurney

[57] ABSTRACT

A gas fired hot water heater includes a housing enclosing an internal chamber divided by a vertical partition into two compartments, the partition having a top edge spaced below the top of the chamber. One of the compartments has a gas burner in the lower portion with an adjacent combustion air intake vent. A first heat exchanger is located in the same compartment above the gas burner but below the top edge of the partition, and a second heat exchanger is located in the other compartment at substantially the same horizontal level as the first. The two heat exchangers are connected in series. Condensate collection means is provided in the other compartment below the second heat exchanger to collect condensate forming on the second heat exchanger and to duct the condensate out of the housing. A flue pipe ducts flue gases from the housing, and a blower is provided to blow the flue gases through the flue pipe. In a particular development, a bimetallic, helically twisted baffle is provided within the straight portions of the central heat exchanger tube, so that temperature swings will cause the bimetallic baffle to expand and contract, thus automatically scouring the internal surface of the tubes, and reducing deposits.

11 Claims, 6 Drawing Figures

4,671,212

GAS FIRED HEAT EXCHANGER FOR HOT WATER WITH BIMETALLIC SCOURING BAFFLE

This invention relates generally to the Domestic Hot Water industry, and in particular to a device for converting a conventional electric or natural gas fired domestic hot water heater to a high efficiency natural gas fired domestic hot water heater.

BACKGROUND OF THIS INVENTION

As the concern for non-renewable resources has grown over the last decade, so has the awareness of the efficiency of various combustion devices, including domestic furnaces and hot water heaters. With this awareness of combustion efficiency has come the development of various high efficiency home heating devices. These devices operate such that the necessity for a chimney is now removed. However, in the case where a homeowner wishes to upgrade the heating system with a high efficiency furnace, a chimney must be maintained for the use of the conventional gas hot water heater. In other cases, a homeowner has an existing electric hot water heater but requires a faster recovery time as well as the benefit of high efficiency and no need to install a chimney. In both of these cases, the need can be seen to develop a domestic hot water retrofit device that will supply an increased recovery rate at a high efficiency and still utilize the existing tank.

GENERAL DESCRIPTION OF THIS INVENTION

In response to this demand, it is the purpose of this invention to supply domestic hot water to an existing storage tank at an increased recovery rate and a high degree of efficiency such that a conventional chimney is unnecessary. The design is such that it can be connected to any existing hot water system with little modification and supplied with a source of natural gas from the low pressure residential line. The only other alteration that is necessary is the interruption of the tank sensor and wiring it directly to the apparatus of this invention.

The principle of operation involves the combustion of natural gas in air within a confined chamber and by means of a small blower, forcing the hot flue gases over a primary and secondary heat exchanger. These two heat exchangers are connected in series and have potable water from the domestic hot water tank circulated through them by means of a small circulating pump. The cooler water from the tank flows through the secondary heat exchanger and condenses the latent heat out of the flue gases. The water then flows into the primary heat exchanger where the temperature of the water is raised sufficiently for fast, safe recovery of water tank losses. The flue gases remaining are then vented through a plastic ABS tube to the outside. The air necessary for combustion is drawn in from the outside through a concentric section of the flue pipe. In this fashion, there are no stack effect losses of interior conditioned air to the outside.

This invention also particularly relates to a bimetallic baffle of helical configuration within the heat exchanger tubes, which due to the temperature swings will act to scour out the inside of the tubes, thus keeping heat transfer efficiency at a maximum.

In an adaptation of the previously described apparatus, the same can be incorporated into an enclosed system including a tank along with a circulating pump, controls, internal connections, insulation and molded plastic cabinets with accessible connections for hot and cold water, gas, electricity, stack and drain.

This modified device would use the same operating principles as described previously, but would be structurally modified to be most conservative of space. In addition, it will be available to satisfy the new housing market or as a complete system for replacement of an outdated or non-functional domestic hot water system where high efficiency is required.

More particularly, this invention provides a gas fired hot water heater, comprising:

a housing insulated with fire-retardant material, the housing enclosing an internal chamber and having an internal, substantially vertical partition dividing the internal chamber into two side-by-side compartments, the partition having a top edge spaced below the top of the internal chamber, one of said compartments having gas burner means in a lower portion thereof and an adjacent combustion air intake vent for allowing combustion air into the lower portion of said one compartment, a first fin tube heat exchanger in said one compartment above the gas burner means but below the top edge of the partition, and a second fin tube heat exchanger in the other compartment at substantially the same horizontal level as said first fin tube heat exchanger, the two fin tube heat exchangers being connected in series, condensate collection means in the second compartment below the second fin tube heat exchanger to collect condensate forming on the second fin tube heat exchanger and to duct the condensate out of the housing, flue means for ducting flue gases out of the housing, and blower means for blowing flue gases through the flue means.

In a particular aspect, this invention provides, for use inside a heat exchanger tube of a furnace or the like, a baffle constructed as a laminate of two dissimilar metals bonded together, the metals having different indices of thermal expansion, the baffle having the shape of a helically twisted band with a width substantially the same as the internal diameter of the heat exchanger tube.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 2:
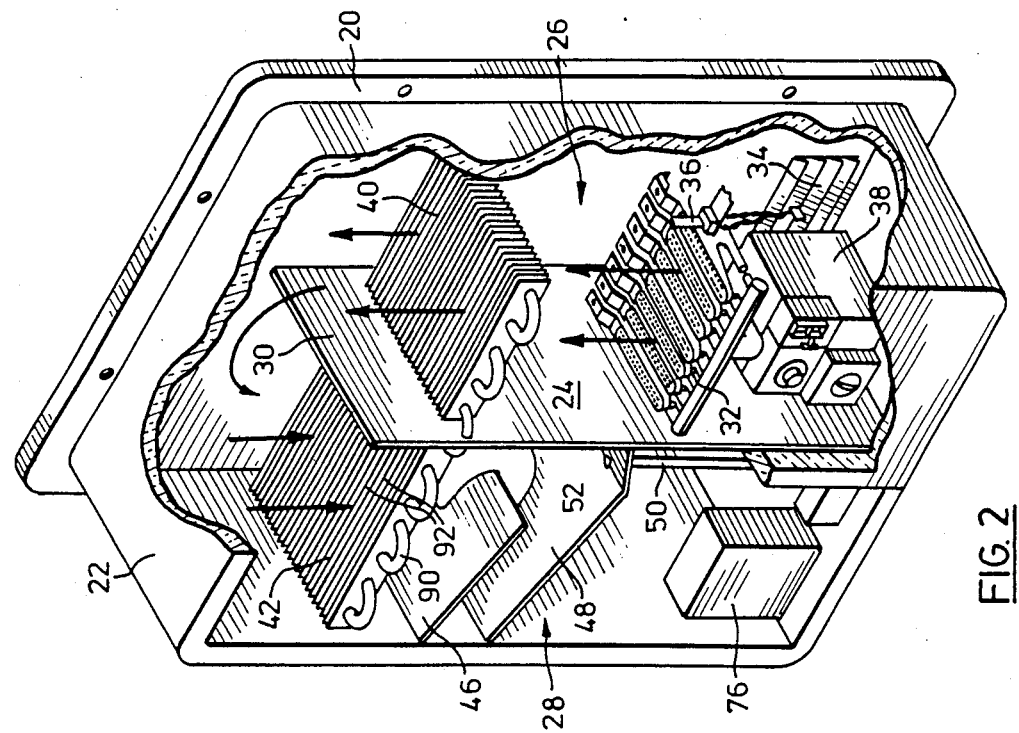
FIG. 2 is a partly broken away perspective view showing the interior of the device of FIG. 1.
Figure 1:
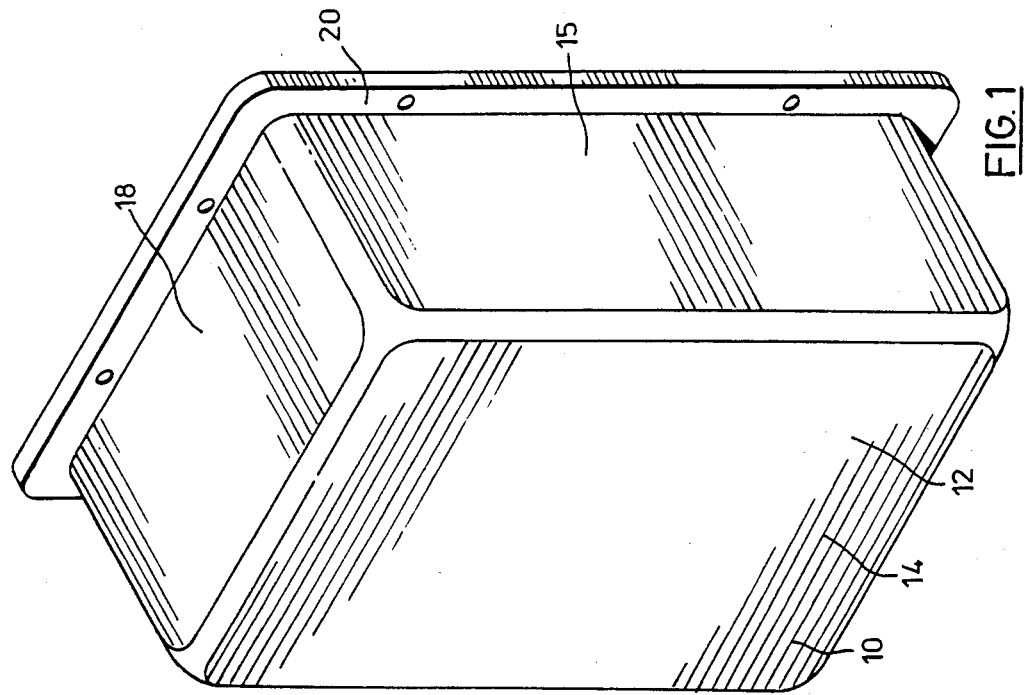
FIG. 1 is a perspective view from the exterior of an add-on conversion device for heating water with natural gas.
Figure 3:
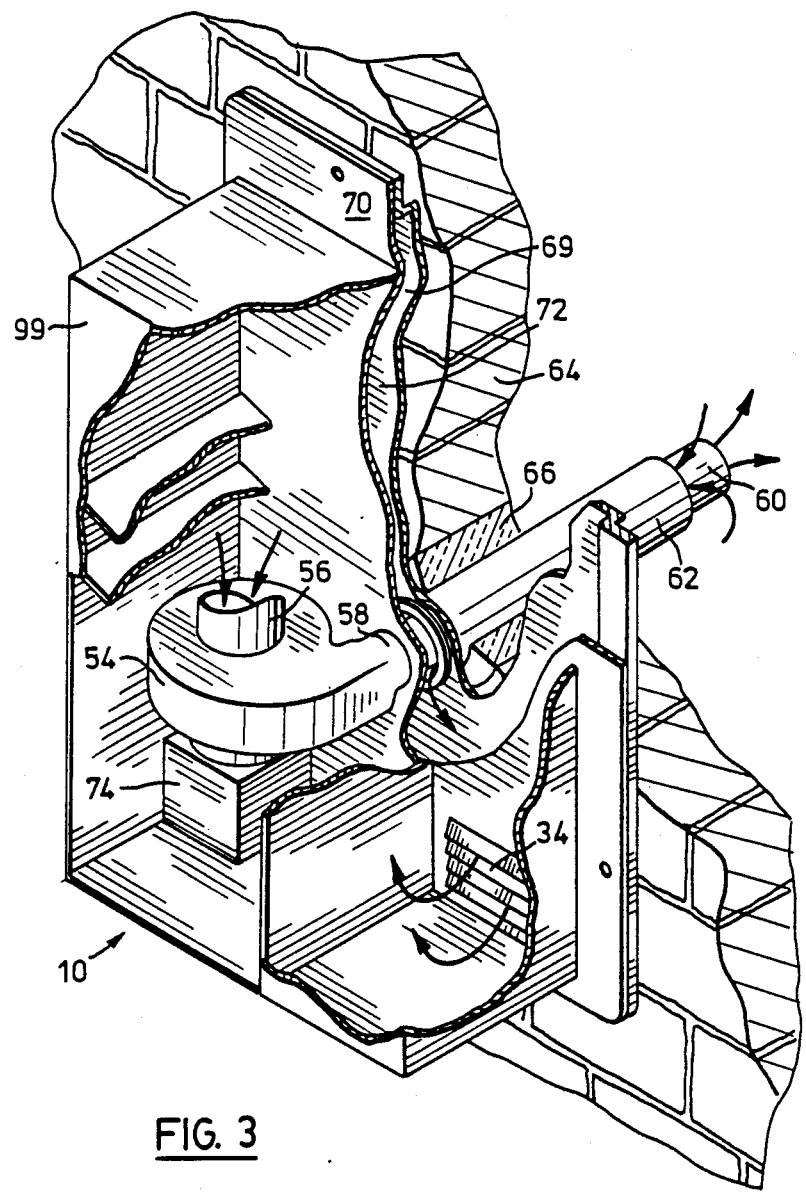
FIG. 3 is a partial perspective view, partly broken away, of the device of FIG. 1, showing additional features and the combustion air and flue gas vent method.

Attention is first directed to FIGS. 1, 2 and 3, which depict the overall layout and relationship of the components of a unit 10. The unit 10 has an external housing 12 which includes an outer wall 14, two side walls 15 (only one seen in FIG. 1), a top wall 18, and a bottom wall which is not visible in FIG. 1. A flange 20 extends around the side walls 15, the top wall 18 and the bottom wall of the unit, and is adapted to facilitate attachment of the unit to a vertical surface, for example the wall of a basement room.

In FIG. 2, the flange 20 has been illustrated, but the remainder of the housing 12 has been taken away to reveal that the housing 12 is lined with a fire retardant insulation 22 which may be fibreglass or other suitable non-combustible material.

Referring to FIG. 2, it will be seen that the housing 12 encloses an internal chamber which has an internal, substantially vertical partition 24 dividing the internal chamber into two side-by-side compartments 26 and 28, the partition 24 having a top edge 30 spaced below the top of the internal chamber defined by the housing 12.

The rightward compartment 26 in FIG. 2 can be seen to include a gas burner 32 in the lower portion thereof, and an air intake vent 34 has been illustrated adjacent to the burner 32, to allow combustion air to enter the compartment 26 at the appropriate location. A standard electric ignition 36 is provided, and a gas valve 38 controls the feed of natural gas to the burner 32.

Still referring to FIG. 2, there is provided a first fin tube heat exchanger 40 in the rightward compartment 26 above the gas burner 32, but below the top edge 30 of the partition, and a second fin tube heat exchanger 42 in the other (leftward) compartment 28 at substantially the same horizontal level as the first fin tube heat exchanger 40. The two fin tube heat exchangers 40 and 42 are connected in series, and it is intended that cold water from a storage tank be fed first to the leftward heat exchanger 42, then pass into the rightward heat exchanger 40, then, at a substantially higher temperature due to the heating, it is returned to the water storage tank.

Located below the heat exchanger 42 is an oblique baffle 46, and below the baffle 46 is a condensate collection means 48 in the shape of a trough which is adapted to collect condensate forming on the second fin tube heat exchanger 42, and to duct the condensate out of the housing 12. To this end, there is provided a condensate drainage tube 50 which communicates with a hole 52 in the trough-shaped condensate collection means 48 at the bottom of the "V" defined by the trough.

There is one further component within the housing 12 which has not been illustrated in FIG. 2 in order to avoid cluttering the drawing. Attention is directed to FIG. 3, in which most of the components described with regard to FIG. 2 have been removed, to reveal that the additional component is a gas blower 54, having an inlet 56, and a tangential outlet 58. The tangential outlet 58 is in communication with a flue pipe 60 which is provided concentrically within an air intake pipe 62, both of the pipes extending through a wall 64 of a building in which the unit 10 is provided. The air intake pipe 62 is surrounded by insulation, as seen at 66.

Also visible in FIG. 3 is the fact that the back wall of the unit 10, i.e. the wall which lies against the building wall 64, is composed of two spaced-apart panels 69 and 70, the two panels being sealed together at their edges, and defining between them a narrow chamber 72 which is in communication with the annular chamber defined between the pipes 60 and 62. Thus, combustion air entering along the pipe 62 and outside of the flue pipe 60 passes into the chamber 72, from where it moves down to the air intake vent 34 which is illustrated in FIG. 3 and is also shown in FIG. 2.

Also shown in FIG. 3 is a pump 74 for pumping water from a water storage tank through the unit 10, i.e. through the two heat exchangers 42 and 40 in series, thence back to the water storage tank.

In FIG. 2, a box 76 contains the electrical controls for the apparatus.

Figure 4:
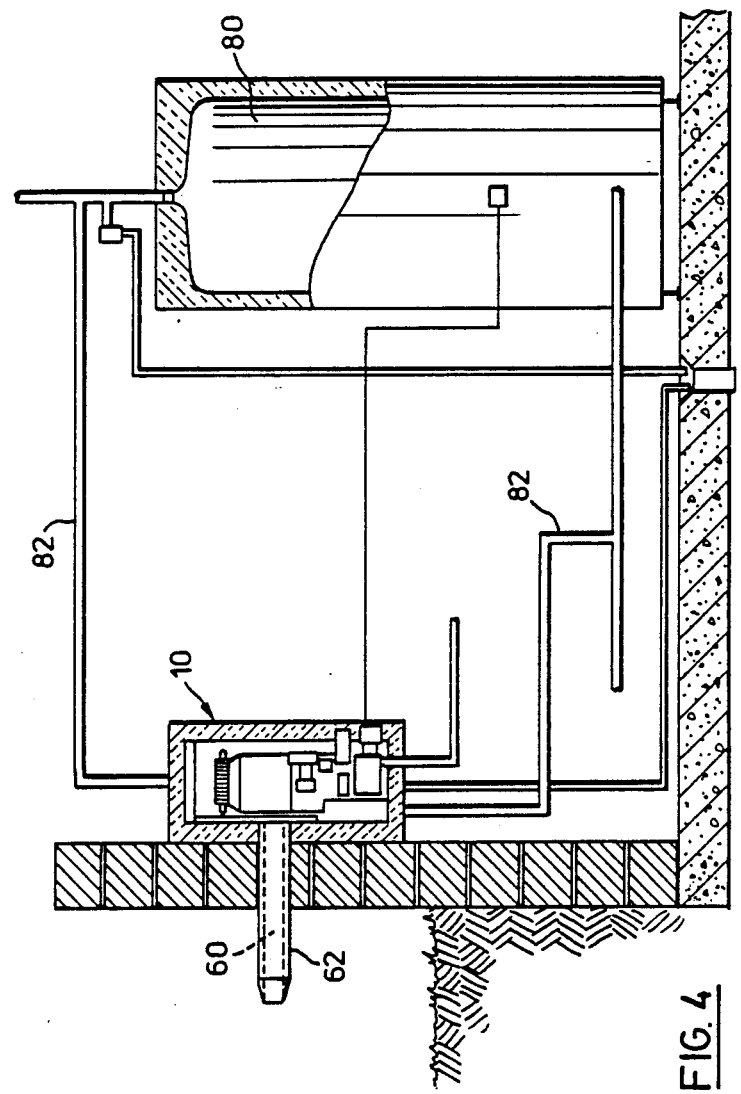
FIG. 4 is a vertical sectional view through a basement room containing a hot water tank and the device of FIG. 1.

FIG. 4 shows the general arrangement in a typical basement room for the unit 10, an insulated hot water storage tank 80, and suitable insulated piping 82 for allowing water to flow from the hot storage tank 80 to the unit 10 to be heated, thence back to the tank 80.

Figure 5:
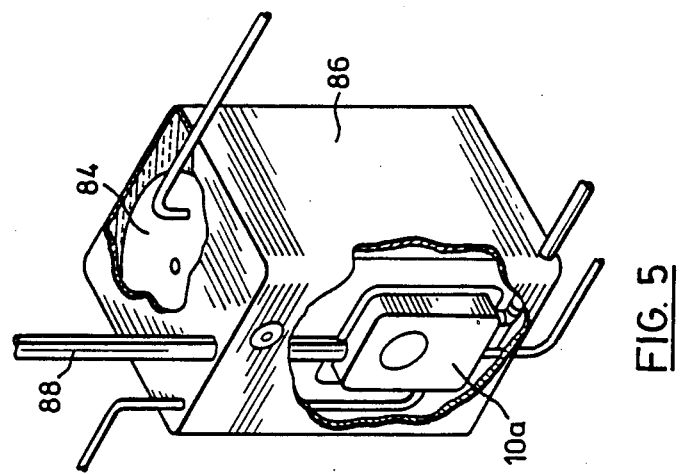
FIG. 5 is a view of a compact unit incorporating both a water tank and a modified unit similar to that shown in FIG. 1.

FIG. 5 shows the basic arrangement of a compact unit which incorporates a hot water tank 84, and a unit 10a similar to the unit 10 shown in FIGS. 1, 2 and 3, but modified so that it can be incorporated with the tank 84 at the time of manufacture in a single insulated housing 86. Aside from the direction of the flue gas pipe 88 (vertically up from the unit 10a), the basic arrangement of components in the unit 10a is the same as that in the unit 10.

Figure 6:
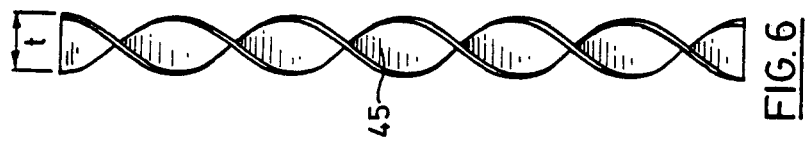
FIG. 6 is an elevational view of a bi-metallic scouring baffle for use with this invention.

A particular feature of this invention is the utilization of a bimetallic baffle twisted into a helical configuration as seen in FIG. 6.

Like most fin tube heat exchangers, the heat exchangers shown at 40 and 42 in FIG. 2 include a tubular conduit 90, typically copper pipe, which is in a boustrophedonic configuration passing through a plurality of spaced-apart fins 92, the conduit thus having rectilinear portions and curved portions. The curved portions are seen extending outwardly from the pack of fins in FIG. 2. However, within the pack of fins, the copper pipe extends rectilinearly.

Inside most if not all of the rectilinear portions of the tubular conduit 90 there is provided a baffle 95 as pictured in FIG. 6. The baffle is constructed as a laminate of two dissimilar metals bonded together, the metals having different indices of thermal expansion. For example the metals may be manganese and a nickel-iron alloy. As particularly seen in FIG. 6, the baffle 95 has the shape of a helically twisted band with a width t substantially the same as the internal diameter of the tubular conduit 90. By sizing the bimetallic baffle 95 to be a snug but slidable fit within the heat exchanger tube, it acts to scour the inside of the tube as temperature swings occur. In other words, the helix seen in FIG. 6 becomes tighter or looser depending upon temperature, and this will result in a scouring action. By constantly scouring the inside of the tubes in this fashion, heat transfer efficiency can be maintained at a maximum by keeping internal deposits to a minimum.

It is pointed out that the chamber 72, being separated from the combustion chamber by only a single wall or partition 70, is naturally heated and acts as a pre-heater for the combustion air.

In the operation of the device shown in FIG. 2 it will be appreciated that the gases are hottest as they pass through the rightward heat exchanger 40, and are somewhat cooled by the time they pass through the leftward heat exchanger 42. By passing the colder water from the storage tank first through the leftward heat exchanger 42, the flue gases are encouraged to release the latent heat of condensation, since in this way the gases can be cooled to the point of condensation. The remaining gases are then drawn out through the powered gas blower 54 and forced through the flue pipe 60 which acts as an exhaust tube. The trough means 48 collects any condensate and this drains through the pipe 50 to a T & P valve from where it has access to a common drain.

Generally, the heat exchanger shown as the unit 10 dissipates its heat into the water that is flowing through it. The water is typically drawn off from the top of the water tank and is pumped through the heat exchanger in a counterflow direction to that of the flue gases, as mentioned previously. The water extracts both latent and sensible heat from the gases, and in so doing has its temperature typically increased to about 200° F., whereupon it is discharged into the water tank.

The gas valve 38 is conventional and regulates the flow and pressure of the natural gas to the burners. It is activated by a tank sensor and is connected in series with an energy cut-off device (not shown) to protect against excessive temperature for the outlet water. Ignition of the gases is performed by the electronic ignition 36. This device is activated by a relay in the box 76 which is energized when the tank sensor calls for heat. The same relay also activates the inline safety sensor and flue gas blower. If there is any fault in the system, the gas valve will not be energized, and therefore ignition will not be allowed to occur. In the event of a failure in the first safety switch, there is an energy cut-off device on the outlet side of the heat exchanger. This device will sense an abnormally high temperature and in turn will interrupt the gas valve circuit and shut the unit down. In this way, there is no possibility of a potentially dangerous situation arising.

FIG. 3 shows an interior cabinet 99 which lies within the insulation 22 of FIG. 2, and preferably this interior cabinet 99 is constructed of thin gauge stainless steel. The outer housing seen at 12 in FIG. 1 is preferably constructed of high impact polypropylene.

While one embodiment of this invention has been illustrated in the accompanying drawings and described hereinabove, it will be evident to those skilled in the art that changes and modifications may be made therein, without departing from the essence of this invention as set forth in the appended claims.

I claim:

1. For use inside a heat exchanger tube of a furnace or the like, a baffle constructed as a laminate of two dissimilar metals bonded together, the metals having different indices of thermal expansion, the baffle having the shape of a helically twisted band with a width substantially the same as the internal diameter of the heat exchanger tube.

2. The invention claimed in claim 1, in which the two dissimilar metals are manganese and a nickel-iron alloy.

3. The invention claimed in claim 1, in which the baffle is twisted through at least four full rotations throughout its length.

4. In combination:
 a cylindrical heat exchanger tube having an inside diameter,
 and inside the tube a baffle constructed as a laminate of two dissimilar metals bonded together, the metals having different indices of thermal expansion, the baffle having the shape of a helically twisted band with a width substantially the same as the said inside diameter.

5. The invention claimed in claim 4, in which the two dissimilar metals are manganese and a nickel-iron alloy.

6. The invention claimed in claim 4, in which the baffle is twisted through at least four full rotations throughout its length.

7. A method of removing deposits from the inside surface of a cylindrical heat exchanger tube having an inside diameter, the method comprising providing within the tube a baffle constructed as a laminate of two dissimilar metals bonded together, the metals having different indices of thermal expansion, the baffle having the shape of a helically twisted band with a width substantially the same as the inside diameter of the heat exchanger tube, and allowing the changes of temperature in the baffle during the normal use of the heat exchanger tube to cause the baffle to expand and contract and thus scour away any deposits on the inside surface of the heat exchanger tube.

8. The invention claimed in claim 7, in which the two dissimilar metals are manganese and a nickel-iron alloy.

9. The invention claimed in claim 7, in which the baffle is twisted through at least four full rotations throughout its length.

10. A gas fired hot water heater, comprising:
 a housing insulated with fire-retardant material, the housing enclosing an internal chamber and having an internal, substantially vertical partition dividing the internal chamber into two side-by-side compartments, the partition having a top edge spaced below the top of the internal chamber,
 one of said compartments having gas burner means in a lower portion thereof and an adjacent combustion air intake vent for allowing combustion air into the lower portion of said one compartment,
 a first fin tube heat exchanger in said one compartment above the gas burner means but below the top edge of the partition, and a second fin tube heat exchanger in the other compartment at substantially the same horizontal level as said first fin tube heat exchanger, the two fin tube heat exchangers being connected in series,
 condensate collection means in the second compartment below the second fin tube heat exchanger to collect condensate forming on the second fin tube heat exchanger and to duct the condensate out of the housing,
 flue means for ducting flue gases out of the housing, and blower means for blowing flue gases through the flue means;
 the flue means including an inner conduit through which said flue gases are exhausted from the chamber, and an outer conduit surrounding the inner conduit to define an annular duct through which combustion air is drawn, and a passageway through which combustion air can pass from the annular duct to said air intake vent;
 each fin tube heat exchanger including a tubular conduit in boustrophedonic configuration passing through a plurality of spaced-apart fins, the conduit thus having rectilinear portions and curved portions, the hot water heater including, within each of at least some of the said rectilinear portions, a baffle constructed as a laminate of two dissimilar metals bonded together, the metals having different indices of thermal expansion, the baffle having the shape of a helically twisted band with a width substantially the same as the internal diameter of the respective rectilinear portion.

11. The invention claimed in claim 10 in which the two dissimilar metals are manganese and a nickel-iron alloy.

* * * * *